(12) United States Patent
Vasiljevich

(10) Patent No.: US 12,308,197 B2
(45) Date of Patent: May 20, 2025

(54) LIQUID METAL ION SOURCE

(71) Applicant: ENPULSION GmbH, Wien-Flughafen (AT)

(72) Inventor: Ivanhoe Vasiljevich, Vienna (AT)

(73) Assignee: ENPULSION GmbH, Wien-Flughafen (AT)

( * ) Notice: Subject to any disclaimer, the term of this patent is extended or adjusted under 35 U.S.C. 154(b) by 166 days.

(21) Appl. No.: 18/124,740

(22) Filed: Mar. 22, 2023

(65) Prior Publication Data

US 2023/0369003 A1    Nov. 16, 2023

(30) Foreign Application Priority Data

May 12, 2022    (EP) .................................. 22 173 000

(51) Int. Cl.
    *H01J 37/08*    (2006.01)
    *B64G 1/40*    (2006.01)
    *H01J 27/02*    (2006.01)

(52) U.S. Cl.
    CPC ............ *H01J 27/024* (2013.01); *B64G 1/413* (2023.08)

(58) Field of Classification Search
    CPC ........ H01J 27/024; H01J 27/26; B64G 1/405; F03H 1/005; F03H 1/0012
    See application file for complete search history.

(56) References Cited

U.S. PATENT DOCUMENTS

| 9,524,848 | B2 * | 12/2016 | Hirsch | ................. | H01J 37/073 |
| 2016/0330867 | A1 * | 11/2016 | Rohr | ....................... | F28F 13/16 |

FOREIGN PATENT DOCUMENTS

| EP | 3789611 A1 | 3/2021 |
| WO | 2019113617 A1 | 6/2019 |

OTHER PUBLICATIONS

Markusic, Thomas E., et al., "Electromagnetic Pumps for Conductive-Propellant Feed Systems," International Electric Propulsion Conference. No. IEPC-2005-295. 2005.
European Search Report corresponding to Application No. 22173000.5-1211, dated Oct. 18, 2022.

* cited by examiner

*Primary Examiner* — Minh D A
(74) *Attorney, Agent, or Firm* — Hoffmann & Baron, LLP

(57) ABSTRACT

A liquid metal ion source, in particular an ion thruster for propulsion of a spacecraft, comprises a reservoir for the liquid metal, an emitter penetrating a front wall of the reservoir for drawing liquid metal from the reservoir and emitting ions of the liquid metal, and an extractor supported with respect to the reservoir and facing the emitter for extracting and accelerating the ions from the emitter, wherein the reservoir is provided with advancing means for creating an electromagnetic field within the liquid metal in the reservoir to exert a force on the liquid metal in a direction towards the emitter.

16 Claims, 3 Drawing Sheets

(State of the Art)

(State of the Art)

LIQUID METAL ION SOURCE

CROSS-REFERENCE TO RELATED APPLICATIONS

This application claims priority to the European Patent Application No. 22 173 000.5 filed May 12, 2022, the disclosure of which is incorporated herein by reference.

TECHNICAL FIELD

The present subject matter relates to a liquid metal ion source, in particular an ion thruster for propulsion of a spacecraft, comprising a reservoir for the liquid metal, an emitter penetrating a front wall of the reservoir for drawing liquid metal from the reservoir and emitting ions of the liquid metal, and an extractor supported with respect to the reservoir and facing the emitter for extracting and accelerating the ions from the emitter.

BACKGROUND

Liquid metal ion sources (LMIS) are used, e.g., for ion implantation or for creating focused ion beams in semiconductor industry, metal finishing, material science and/or analysis, and in ion thrusters for propulsion of spacecraft. In an LMIS, the liquid metal is heated to its liquid state in the reservoir and drawn therefrom by the emitter from which ions of the liquid metal are electrically extracted and accelerated by the extractor to form a directed beam of liquid metal ions. The emitter of the LMIS has one or more emission sites, typically projections in the shape of cones, pyramids, triangular prisms, or the like. To achieve a strong electric field between the emitter and the extractor, which is necessary for ion extraction, the projections are sharp-tipped or sharp-edged to utilize the field-concentrating effect of the tip or edge. Applying the electric field to such a sharp tip or edge causes the formation of a so-called Taylor cone on top of the tip or edge of the emitter's projection; neutral atoms of liquid metal at the apex of the Taylor cone evaporate from the surface, due to field emission negative electrons tunnel back to the surface changing the formerly neutral atoms to positively charged ions. The thusly created ions are extracted from the Taylor cone and accelerated by the electric field.

This principle of creating positive ions and accelerating them by the very same electric field is used to generate the directed ion beam and, in ion thrusters, a thrust. The ion-beam and, thus, the thrust can be accurately controlled by the strength of the electric field. As moving parts that generally increase system complexity and are prone to malfunction are avoided, LMIS are beneficial; due to their low complexity and weight, and their high reliability, durability and efficiency, LMIS-type ion thrusters, e.g., field-emission electric propulsion (FEEP) systems, which use the liquid metal (usually either caesium, indium, gallium, mercury or bismuth) as propellant for propulsion of spacecraft are particularly attractive.

For transporting liquid metal from the reservoir to the sharp tip or edge of each projection of the emitter, passive forces, like capillary effects produced by capillary channels penetrating the emitter or by a porous emitter and/or adhesion effects on the wetting surface of the emitter's projections, are usually employed in LMIS. However, under certain conditions, e.g., after pausing the ion emission or when a substrate, e.g., on the emitter's surface, impedes propellant flow, these passive forces might not be sufficient to transport the liquid metal up to the tip or edge of the emitter's projection(s). In these cases, an extraction and acceleration of ions from the emitter by the extractor cannot be achieved as the Taylor cone is not formed; the LMIS fails. Applying external forces, e.g., pressurising the reservoir from a separate pressure reservoir or by means of mechanical pumps or pistons, is not desirable for safety, reliability and complexity reasons, particularly in spacecraft.

BRIEF SUMMARY

It is an object of the present subject matter to provide a safe, reliable and efficient liquid metal ion source.

This object is achieved with an ion thruster specified at the outset, wherein the reservoir is provided with advancing means for creating an electromagnetic field within the liquid metal in the reservoir to exert a force on the liquid metal in a direction towards the emitter.

By including the advancing means for exerting a force on the liquid metal, failures of the LMIS due to a lack of liquid metal on the tip or edge of the one or more projections of the emitter can reliably be prevented; hence, the present LMIS is more reliable without requiring, e.g., a hazardous pressure and, therefore, also safer.

It shall be understood that a neither a continuous nor a strong force is required to ensure the supply of liquid metal to the tip or edge of the emitter's projections. Slightly moving the centre of mass of the liquid metal in the reservoir (typically in the range of less than a few millimetres) is sufficient. Moreover, the advancing means can be kept activated to assist the capillary flow, thereby impacting the ion emission in an efficient and reliable way. Alternatively, the advancing means can be deactivated once the Tailor cone forms as passive forces in the LMIS sustain the liquid metal supply; this makes the LMIS particularly efficient and reliable by helping to avoid an oversupply of the tip or edge of the emitter's projections resulting in larger drops of liquid metal thereon which may cause a destructive short-circuit between the emitter and the extractor.

Moreover, an electromagnetic field can be created in different ways all of which are particularly easily feasible and reliable. In a beneficial embodiment, said advancing means are configured to create an alternating electromagnetic field within the liquid metal with a field strength decreasing towards the emitter. The alternating electromagnetic field induces eddy currents in the liquid metal in the reservoir which, in turn, create an inner electromagnetic field opposed to the alternating electromagnetic field of the advancing means according to Lenz's law. The resulting repulsion exerts a force in the direction of decreasing field strength, i.e., towards the emitter. By varying the strength of the electromagnetic field, the force can accurately and efficiently be controlled such that the formation of larger drops on the tip or edge of the emitter's projections can be avoided.

The alternating electromagnetic field can be created by moving, e.g., rotating or oscillating, permanent magnets or electromagnetic coils. In a particularly advantageous variant, said advancing means comprise an AC power source and one or more electromagnetic coils connected to the AC power source. In this variant, the advancing means can be formed without any moving parts; the LMIS is, thus, particularly robust and reliable.

In this variant, at least one of said electromagnetic coils favourably has a coil axis traversing the reservoir from the emitter to a rear wall opposite the front wall and is arranged closer to the rear wall. The advancing means can, thereby, be formed using a single coil, which makes power supply and control particularly easy and accurate.

In an alternative or additional beneficial variant, said advancing means comprise at least two electromagnetic coils which are circumferentially distributed about an axis traversing the reservoir from the emitter to a rear wall opposite the front wall and are arranged closer to the rear wall. Thereby, small electromagnetic coils of standard size can be universally employed for reservoirs of different sizes; moreover, comprising two or more electromagnetic coils enhances the reliability of the LMIS as, even in the unlikely case of failure of one (or more) of the coils, a force can be exerted on the liquid metal by means of the functional electromagnetic coils.

While the one or more electromagnetic coils could be located inside the reservoir and insulated from the liquid metal, it is advantageous, when the electromagnetic coils are arranged outside the reservoir, and the reservoir has electrically non-conductive lateral walls extending from the front wall to the opposite rear wall. This reliably prohibits a physical contact between the electromagnetic coils and the liquid metal. Moreover, the reservoir does not require any through holes but fully encloses the liquid metal therein.

In an alternative or even additional embodiment, said advancing means are favourably configured to create both a magnetic field traversing the reservoir and an electric current flowing through the liquid metal in the reservoir, wherein a vector component of the magnetic field, a vector component of the electric current, and the axis traversing the reservoir from the emitter to the opposite rear wall are orthogonal to each other. In this embodiment the electromagnetic field exerts a completely different force on the liquid metal in the reservoir, a Lorentz force. The Lorentz force is likewise easy to exert and to control without any moving parts. The magnetic field can either be created by a permanent magnet or by an electromagnetic coil. Moreover, by simply changing the direction of either the electric current or the magnetic field, a force away from the emitter, i.e., an retracting force, can be exerted on the liquid metal if required. Furthermore, by permanently controlling the electric current and/or the magnetic field and, hence, the force exerted on the liquid metal in a direction towards and/or away from the emitter, the ion beam and its composition, i.e., the size of emitted drops, can easily, efficiently and accurately be controlled.

In a further alternative or additional embodiment, said advancing means are advantageously configured to let the electromagnetic field travel towards the front wall. Like in a linear induction motor, such a travelling field, e.g., a linear travelling field, induces an opposing electromagnetic field in the liquid metal which also propagates towards the emitter according to Lenz's law and, thus, results in the force in direction towards the emitter. This embodiment can be achieved by means of mechanically moving electromagnetic coils or permanent magnets, or—without any mechanical parts—by several electromagnetic coils distributed in axial direction of the reservoir (e.g., outside the reservoir) and energised in a sequence from the rear towards the front of the reservoir. By the speed and/or the strength of the travelling electromagnetic field, the force exerted on the liquid metal can easily be controlled.

As mentioned earlier, it might be desirable in some situations, e.g., when a large droplet forms on the tip or edge of the one or more projections of the emitter, to exert a retracting force on the liquid metal, i.e., a force away from the emitter. To this end, the reservoir is beneficially also provided with retracting means configured to create an alternating electromagnetic field within the liquid metal with a field strength increasing towards the front wall. The alternating electromagnetic field can be created by any of the methods mentioned above with respect to the advancing means creating an alternating electromagnetic field.

Alternatively or even additionally, the reservoir is advantageously provided with retracting means comprising a first and a second electrode and an electric power source connected to the first and second electrodes, wherein the first electrode is in contact with the liquid metal and the second electrode is insulated from the liquid metal by a dielectric and arranged at the rear wall opposite the front wall. Thereby, the surface of the liquid metal facing the second electrode and the second electrode form a capacitor, the electrodes of which attract each other due to electrostatic forces when energised with opposing polarity resulting in a force exerted on the liquid metal in a direction away from the emitter. By, alternatively, energizing both electrodes with the same polarity, a force in the direction towards the emitter is exerted on the liquid metal, which supports the advancing means.

BRIEF DESCRIPTION OF THE DRAWINGS

The subject matter shall now be explained in more detail below on the basis of exemplary embodiments thereof with reference to the accompanying drawings, in which.

DETAILED DESCRIPTION

Figure 1A:
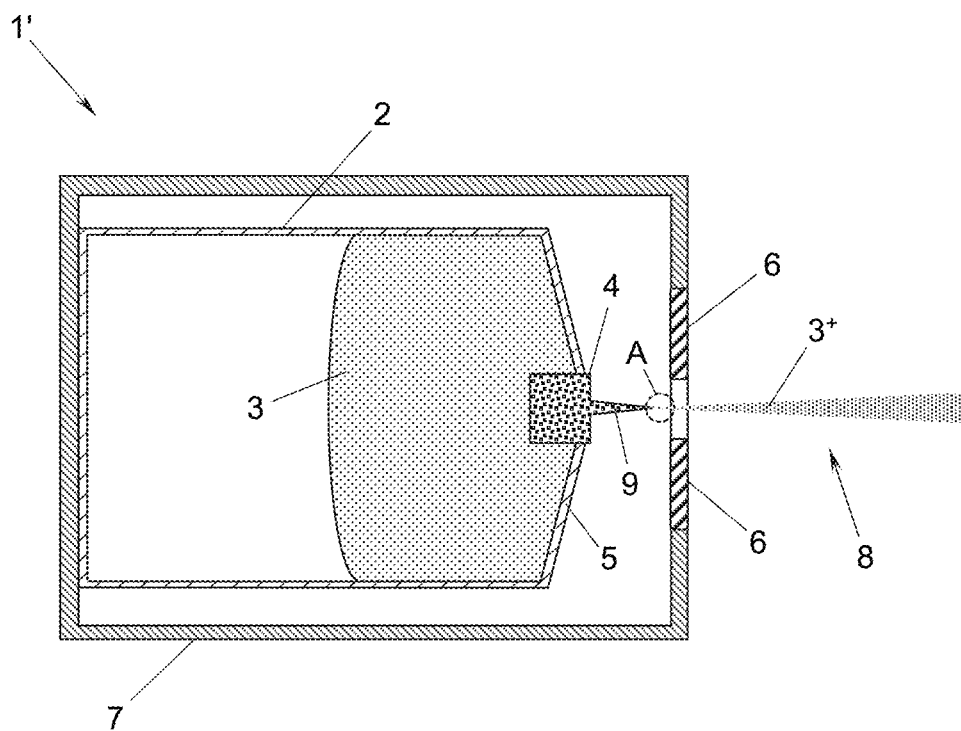
FIGS. 1a and 1b show an example of a liquid metal ion source according to the state of the art in a longitudinal section (FIG. 1a) and a detail A thereof (FIG. 1b), respectively.

FIG. 1a shows a liquid metal ion source (LMIS) 1' according to the state of the art. The LMIS 1' comprises a reservoir 2 for liquid metal 3 which is heated above the liquefaction temperature in the reservoir 2. The LMIS 1' further comprises an emitter 4 which penetrates a front wall 5 of the reservoir 2 in order to draw liquid metal 3 from the reservoir and to emit ions $3^+$ of the liquid metal 3. Moreover, the LMIS 1' comprises an extractor 6 which is supported with respect to the reservoir 2, e.g., by means of a supporting structure 7 (like a support frame or, here, a housing of the LMIS 1') facing the emitter 4. The extractor 6 extracts and accelerates the ions $3^+$ from the emitter 4 to generate an ion beam 8 away from the emitter 4 and, thus, from the LMIS 1'.

Figure 1B:
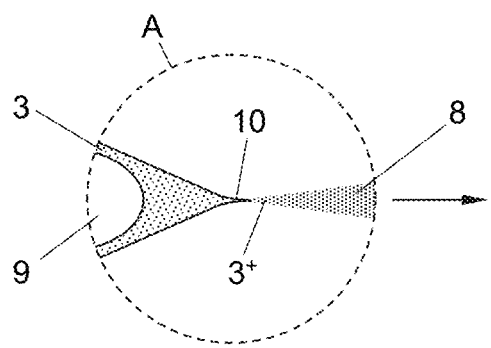

For emitting the ions $3^+$, the emitter 4 has one or more emission sites, each of which is a projection 9 in the shape of a cone, a pyramid, a triangular prism, a needle or the like and has a sharp tip or edge on the far side of the emitter 4. Applying a strong electric field to such a sharp tip or edge by means of the extractor 6 causes the formation of a so-called Taylor cone 10 on top of the tip or edge of each projection 9 of the emitter 4 (FIG. 1b). At the apex of the Taylor cone 10 neutral atoms of liquid metal 3 evaporate from the surface and, due to field emission, negative electrons tunnel back to the surface such that positively charged ions $3^+$ of liquid metal 3 remain. The ions $3^+$ are extracted and accelerated by the same strong electric field between the extractor 6 and the emitter 4. Thereby the ion beam 8 is created and directed away from the LMIS 1'.

For drawing liquid metal 3 from the reservoir 2 and transporting it to the sharp tip or edge of each projection 9 of the emitter 4, the emitter 4 is permeable to the liquid metal 3. To this end, the emitter 4 is, e.g., penetrated by capillary channels (not shown) or (in the present example) is made of porous material. The projections 9 are likewise penetrated by capillary channels or of a porous material and/or have a wetting surface to which the liquid metal adheres. The capillary channels, the porous material and/or the wetting surface of the projection 9 generate a capillary effect on the liquid metal 3, i.e., a force towards the sharp tip or edge of each projection 9.

In some cases, however, these passive capillary forces might not be sufficient to transport the liquid metal 3 to the very tip or edge of the projection 9, such that the Taylor cone 10 cannot be formed and the LMIS 1' fails.

With reference to FIGS. 2a, 2b, 3 and 4, a more reliable LMIS 1 shall be exemplified. Therein, components of comparable or identical function as described above share the same reference numerals. The LMIS 1 is, e.g., used for ion implantation, to create ion beams, in an ion thruster for propulsion of spacecraft, etc.

To exert a force on the liquid metal 3 in the reservoir 2 in a direction towards the emitter 4, the reservoir 2 is provided with advancing means 11 that create an electromagnetic field 12 within the liquid metal 3 in the reservoir 2. In the examples or FIGS. 2a and 2b, said advancing means 11 are configured to create an alternating electromagnetic field 12 within the liquid metal 3 symbolised by dotted field lines, the respective distances between two of which indicate the field strength. The field strength of the electromagnetic field 12 decreases towards the emitter 4. Thereby, the force towards the emitter 4 is exerted on the liquid metal 3 in the reservoir 2 as symbolised by arrows 13 in FIGS. 2a and 2b. This force is a consequence of an eddy current induced by the alternating electromagnetic field 12 in the liquid metal 3, which creates an opposing electromagnetic field according to Lenz's law.

Figure 2A:
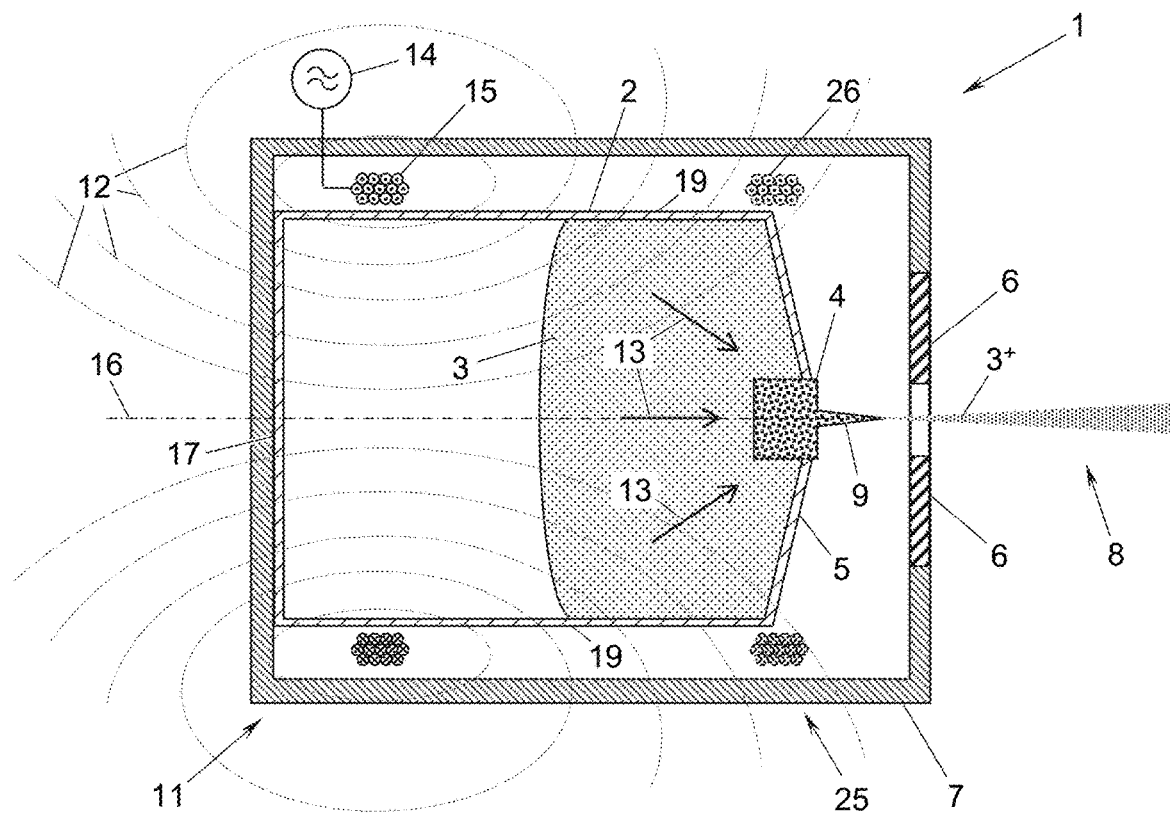
FIGS. 2a and 2b show a first (FIG. 2a) and a second (FIG. 2b) embodiment of a liquid metal ion source according to the present subject matter, each in a longitudinal section.
Figure 2B:
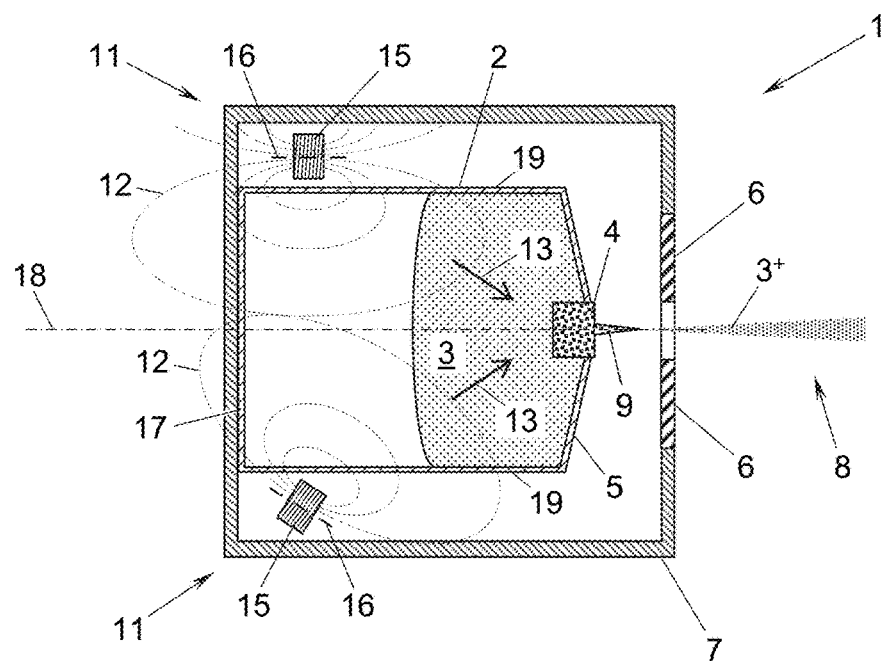

The alternating electromagnetic field 12 can either be created by moving permanent magnets or electromagnetic coils. In the examples of FIGS. 2a and 2b, however, the advancing means 11 comprise an alternating current (AC) power source 14 and one or more non-moving electromagnetic coils 15 which are connected to the AC power source 14. As shown in FIG. 2a, at least one of said electromagnetic coils 15 has a coil axis 16 traversing the reservoir 2 from the emitter 4 to a rear wall 17 of the reservoir 2. The rear wall 17 is opposite the front wall 5 and, thus, opposite the emitter 4 which penetrates the front wall 5. Therein, the electromagnetic coil 15 is arranged closer to the rear wall 17 than to the front wall 5 to create the electromagnetic field 12 with a field strength that decreases towards the emitter 4.

In the alternative example of FIG. 2b, the advancing means 11 comprise at least two electromagnetic coils 15 which are circumferentially distributed about an axis 18 that traverses the reservoir 2 from the emitter 4 to the rear wall 17. As before, the electromagnetic coils 15 in the example of FIG. 2b are arranged closer to the rear wall 17 than to the front wall 5 for the above mentioned reason. It shall be noted, that the coil axes 16 of the electromagnetic coils 15 in the embodiment of FIG. 2b may be substantially in parallel with the axis 18 traversing the reservoir 2 (as depicted in the top portion of FIG. 2b), inclined thereto (as depicted in the bottom portion of FIG. 2b), perpendicular thereto, or even skew thereto, e.g., in circumferential direction of the reservoir 2.

In the examples of FIGS. 2a and 2b, the respective electromagnetic coils 15 are arranged outside the reservoir 2. Accordingly, the reservoir 2 has electrically non-conductive lateral walls 19 which extend from the front wall 5 to the opposite rear wall 17, both of which may also be of non-conductive material. The term "non-conductive" herein identifies materials that show no (in fact: hardly any) electrical conduction, i.e. insulators. Also the supporting structure or housing 7 of the LMIS 1 may optionally be non-conductive.

It shall be noted that at least some of the electromagnetic coils 15 could alternatively be arranged inside the reservoir 2, particularly when at least some of the walls 5, 17, 19 are made of conductive material, and that the embodiments of FIGS. 2a and 2b may optionally be combined.

Figure 3:
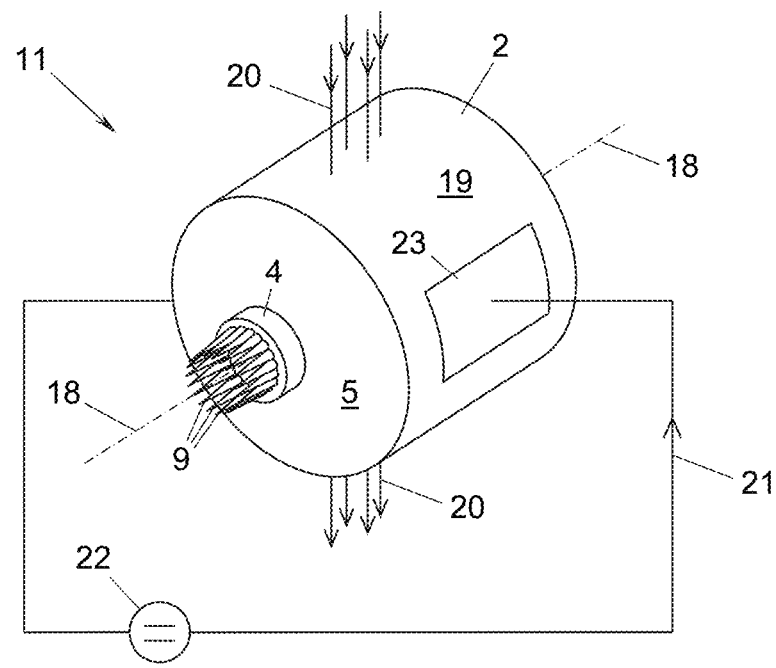
FIG. 3 schematically shows a reservoir and an emitter of a third embodiment of the liquid metal ion source according to the subject matter in a perspective front view.

A further alternative or additional embodiment is shown in FIG. 3. In this embodiment, the advancing means 11 create a magnetic field 20 which traverses the reservoir 2. In addition, the advancing means 11 create an electric current 21 flowing through the liquid metal 3 in the reservoir 2. The magnetic field 20, the electric current 21 and the axis 18 transversing the reservoir 2 from the emitter 4 to the opposite rear wall 17 are orthogonal to each other in the present example; however, they are at least not in parallel with one another, i.e., at least a component of a vector representing the magnetic field 20, a component of a vector representing the electric current 21 and the axis 18 traversing the reservoir 2 are orthogonal to each other. Thereby, a Lorentz force is exerted on the liquid metal 3 in a direction towards the emitter 4.

In this example, the magnetic field 20 can be created by the permanent magnet or by an electromagnetic coil (not shown); the electric current 21 is yielded in the liquid metal 3 by means of an electric power source 22 and lateral electrodes 23 in the reservoir 2. By inverting either the magnetic field 20 or the electric current 21, a force in a direction away from the emitter 4 can be exerted on the liquid metal 3 in the reservoir 2, i.e., a retracting force, if desired.

In the example of FIG. 3 the emitter 4 has a multitude of projections 9 that are arranged in a circle on the emitter 4, thereby forming a crown-shape. It shall be understood, that the present LMIS 1 may comprise an emitter 4 with any number and arrangement of projections 9.

Figure 4:
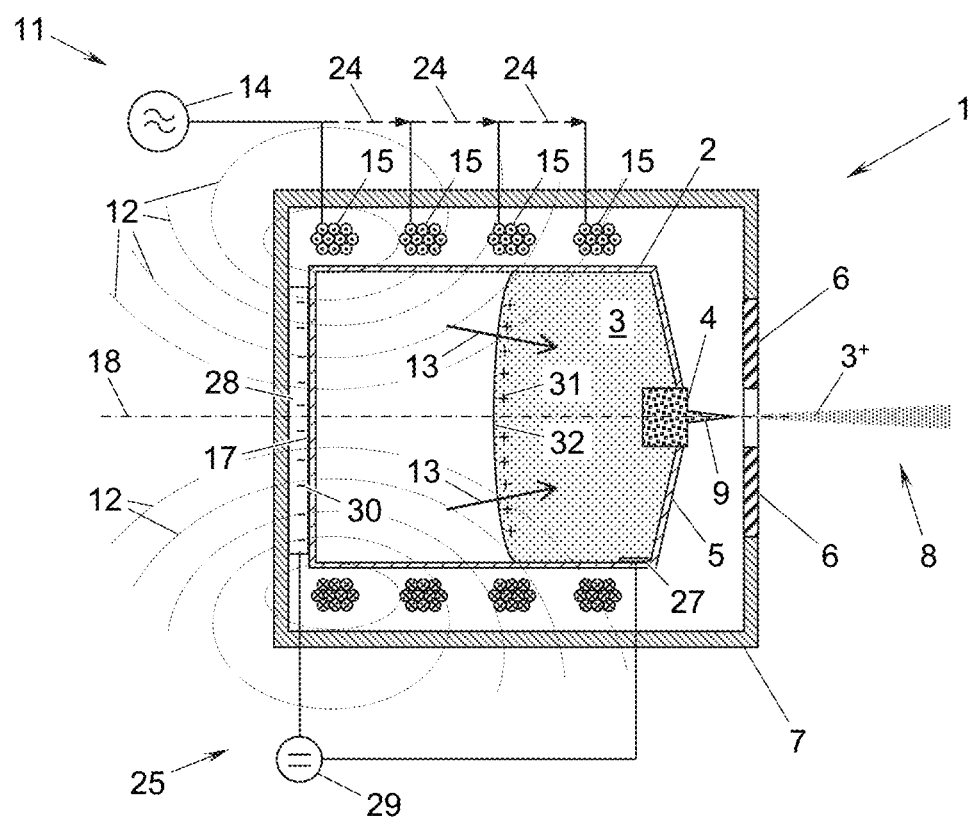
FIG. 4 shows a fourth embodiment of the liquid metal ion source according to the subject matter in a longitudinal section.

FIG. 4 shows a further alternative or additional embodiment, wherein the advancing means 11 create an electromagnetic field 12 that travels towards the front wall 5 of the reservoir 2 as symbolised by arrows 24. The electromagnetic field 12 in the shown example is an alternating current (AC) or a direct current (DC) electromagnetic field that moves from one electromagnetic coil 15 to an adjacent one in a direction from the rear wall 17 towards the front wall 5, thereby creating a travelling field similar to a linear induction motor. The travelling electromagnetic field 12 induces an eddy current in the liquid metal 3 in the reservoir 2 and, due to Lenz's Law, a force in a direction towards the emitter 4 (arrows 13). It shall be noted, that the electromagnetic field 12 could alternatively be created by means of moving electromagnetic coils and/or permanent magnets (not shown). By inverting the direction of travel of the electromagnetic field 12, a retracting force can be exerted on the liquid metal 3 in the reservoir 2.

The reservoir 2 may optionally be provided with retracting means 25. As briefly noted above, the retracting means 25 can be achieved by inverting the magnetic field 20 or the electric current 21 of the advancing means 11 in the embodiment of FIG. 3, or the direction of travel of the electromagnetic field 12 in the embodiment of FIG. 4.

In the example of FIG. 2a, the retracting means 25 comprise one or more electromagnetic coils 26 which are connected to an AC power source (not depicted) and arranged closer to the front wall 5 of the reservoir 2 than to its rear wall 17. When activated, the retracting means 25 create an alternating electromagnetic field (not shown) within the liquid metal 3, the field strength of which increases towards the front wall 5 of the reservoir 2. The same can be achieved in the embodiment of FIG. 2b with two or more electromagnetic coils (not shown) circumferentially distributed about the axis 18 closer to the front wall 5.

In the example of FIG. 4, a further embodiment of the retracting means 25 is shown which can be combined with any other embodiment. In this example, the retracting means 25 comprise a first and a second electrode 27, 28 and an electric power source 29 connected to the electrodes 27, 28. A first electrode 27 is in contact with the liquid metal 3, e.g., at the emitter 4 or close to the front wall 5. The second electrode 28 is insulated from the liquid metal 3 in the reservoir 2 by a dielectric, in the present example, the dielectric is the rear wall 17 of the reservoir 2; in other examples the second electrode 28 could be located inside the reservoir 2 and insulated from the liquid metal 3 by the dielectric. However, the second electrode 28 is arranged at the rear wall 17 such that when the electric power source 29 is activated and the electrodes 27, 28 are charged (here: negative charges 30 at the second electrode 28) positive charges 31 are electrostatically attracted at the surface 32 of the liquid metal 3 facing the second electrode 28. Thereby, the positively charged surface 32 of the liquid metal 3 is attracted by the second electrode 28, such that a retracting force is exerted on the liquid metal 3 in the reservoir 2.

It is understood that the same retracting force can be achieved with the opposite polarity of the electrodes 27, 28, i.e., the second electrode 28 being positively charged (not shown), thereby attracting negative charges at the surface 32 of the liquid metal 3. Moreover, by providing both electrodes 27, 28 with the same charges, i.e., either positive charges or negative charges for both electrodes 27, 28, an advancing force towards the emitter 4 can be exerted on the liquid metal 3.

The subject matter is not restricted to the specific embodiments described in detail herein but encompasses all variants, modifications and combinations thereof that fall within the scope of the appended claims.

What is claimed is:

1. A liquid metal ion source, comprising
a reservoir for liquid metal,
an emitter penetrating a front wall of the reservoir for drawing the liquid metal from the reservoir and emitting ions of the liquid metal, and
an extractor supported with respect to the reservoir and facing the emitter for extracting and accelerating the ions from the emitter,
wherein the reservoir is provided with advancing means for creating an electromagnetic field within the liquid metal in the reservoir to exert a force on the liquid metal in a direction towards the emitter, wherein said advancing means are configured to create an alternating electromagnetic field within the liquid metal with a field strength decreasing towards the emitter.

2. The liquid metal ion source according to claim 1, wherein said advancing means comprise an AC power source and one or more electromagnetic coils connected to the AC power source.

3. The liquid metal ion source according to claim 2, wherein at least one of said one or more electromagnetic coils has a coil axis traversing the reservoir from the emitter to a rear wall opposite the front wall and is arranged closer to the rear wall.

4. The liquid metal ion source according to claim 2, wherein said advancing means comprise at least two electromagnetic coils which are circumferentially distributed about an axis traversing the reservoir from the emitter to a rear wall opposite the front wall and are arranged closer to the rear wall.

5. The liquid metal ion source according to claim 2, wherein the one or more electromagnetic coils are arranged outside the reservoir, and wherein the reservoir has electrically non-conductive lateral walls extending from the front wall to an opposite rear wall.

6. The liquid metal ion source according to claim 1, wherein the liquid metal ion source is an ion thruster for propulsion of a spacecraft.

7. A liquid metal ion source, comprising
a reservoir for liquid metal,
an emitter penetrating a front wall of the reservoir for drawing the liquid metal from the reservoir and emitting ions of the liquid metal, and
an extractor supported with respect to the reservoir and facing the emitter for extracting and accelerating the ions from the emitter,
wherein the reservoir is provided with advancing means for creating an electromagnetic field within the liquid metal in the reservoir to exert a force on the liquid metal in a direction towards the emitter, wherein said advancing means are configured to create both a magnetic field traversing the reservoir and an electric current flowing through the liquid metal in the reservoir, wherein a vector component of the magnetic field, a vector component of the electric current, and an axis traversing the reservoir from the emitter to an opposite rear wall are orthogonal to each other.

8. The liquid metal ion source according to claim 7, wherein the liquid metal ion source is an ion thruster for propulsion of a spacecraft.

9. A liquid metal ion source, comprising
a reservoir for liquid metal,
an emitter penetrating a front wall of the reservoir for drawing the liquid metal from the reservoir and emitting ions of the liquid metal, and
an extractor supported with respect to the reservoir and facing the emitter for extracting and accelerating the ions from the emitter,
wherein the reservoir is provided with advancing means for creating an electromagnetic field within the liquid metal in the reservoir to exert a force on the liquid metal in a direction towards the emitter, wherein the reservoir is further provided with retracting means configured to create an alternating electromagnetic field within the liquid metal with a field strength increasing towards the front wall.

10. The liquid metal ion source according to claim 9, wherein the liquid metal ion source is an ion thruster for propulsion of a spacecraft.

11. The liquid metal ion source according to claim 9, wherein said retracting means comprise an AC power source and one or more electromagnetic coils connected to the AC power source.

12. The liquid metal ion source according to claim 11, wherein at least one of said one or more electromagnetic coils has a coil axis traversing the reservoir from the emitter to a rear wall opposite the front wall and is arranged closer to the front wall.

13. The liquid metal ion source according to claim 11, wherein said retracting means comprise at least two electromagnetic coils which are circumferentially distributed about an axis traversing the reservoir from the emitter to a rear wall opposite the front wall and are arranged closer to the front wall.

14. The liquid metal ion source according to claim 11, wherein the one or more electromagnetic coils are arranged outside the reservoir, and wherein the reservoir has electrically non-conductive lateral walls extending from the front wall to an opposite rear wall.

15. A liquid metal ion source, comprising
a reservoir for liquid metal,
an emitter penetrating a front wall of the reservoir for drawing the liquid metal from the reservoir and emitting ions of the liquid metal, and
an extractor supported with respect to the reservoir and facing the emitter for extracting and accelerating the ions from the emitter,
wherein the reservoir is provided with advancing means for creating an electromagnetic field within the liquid metal in the reservoir to exert a force on the liquid metal in a direction towards the emitter, wherein the reservoir is further provided with retracting means comprising a first and a second electrode and an electric power source connected to the first and second electrodes, and wherein the first electrode is in contact with the liquid metal and the second electrode is insulated from the liquid metal by a dielectric and arranged at a rear wall opposite the front wall.

16. The liquid metal ion source according to claim 15, wherein the liquid metal ion source is an ion thruster for propulsion of a spacecraft.

* * * * *